United States Patent [19]

Sweeney, Jr.

[11] 4,047,300
[45] Sept. 13, 1977

[54] METHOD AND APPARATUS FOR REPAIRING DAMAGED MATERIALS PARTICULARLY SUITED TO REPAIRING KNIT OR POLYESTER MATERIALS

[76] Inventor: John L. Sweeney, Jr., 4300 NE. Sunset Blvd. No. B6, Renton, Wash. 98055

[21] Appl. No.: 642,897

[22] Filed: Dec. 22, 1975

[51] Int. Cl.² .............................................. B32F 1/32
[52] U.S. Cl. ...................................... 30/358; 83/586; 156/98; 156/258
[58] Field of Search ................ 156/98, 256, 258, 252; 83/570, 569, 685, 586 X, 587; 30/315, 316, 358 X, 277 X

[56] References Cited

U.S. PATENT DOCUMENTS

| | | | |
|---|---|---|---|
| 3,096,015 | 7/1963 | Bradbury | 83/685 |
| 3,271,217 | 9/1966 | Mapson | 156/98 |
| 3,288,665 | 11/1966 | Conti | 83/685 |
| 3,299,761 | 1/1967 | Goldman | 83/685 |
| 3,463,042 | 8/1969 | Goldman | 83/684 |
| 3,513,048 | 5/1970 | Snyder | 156/98 |
| 3,772,114 | 11/1973 | Kowalchuk | 156/98 |

*Primary Examiner*—Edward G. Whitby
*Attorney, Agent, or Firm*—David H. Deits; Roy E. Mattern, Jr.; Kenneth S. Kessler

[57] ABSTRACT

Apparatus for repairing portions of damaged material such as clothing fabric is described. A piece of mending cloth identical to the damaged material is placed over the damaged area of a fabric to be repaired, aligned and further placed upon a flat cutting die of metal having several different sized round holes therein. The proper hole is selected, the top edge about the parimeter acting as the cutting die. A cooperating punch assembly containing a cylindrical holder which can contain one metal sphere or two such spheres. If the punch assembly contains two such spheres, one may be swiveled or turned end for end so as to cut with the desired sphere. The spherical ball partically protrudes from the one end of a holder through a hole about which surrounds a shoulder area for cooperating with the die plate. The spherical ball is held loosely within the holder by retaining means opposite to the shoulder region. A rigid shaft, spring loaded extends from that part of the sphere remote from the fabric striking end of the sphere to the outer end of the cylindrical holder. To perform the desired cutting operation, the cutting tool is placed over the desired material to be cut in further cooperation with the cutting anvil. The rigid shaft is withdrawn against the spring biased means. The rigid shaft is then released with the force thereof impacting against the spherical cutting tool thereby forcing the ball into contact with the cutting edge of the metal die or anvil.

9 Claims, 12 Drawing Figures

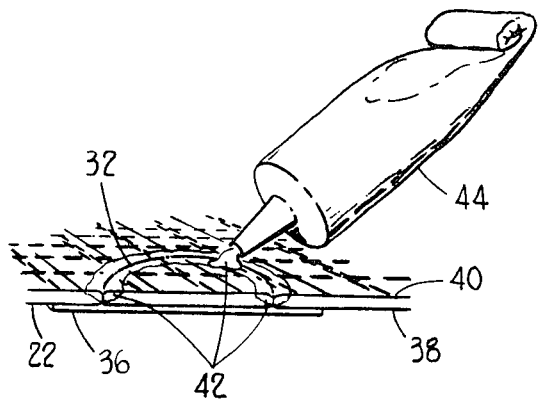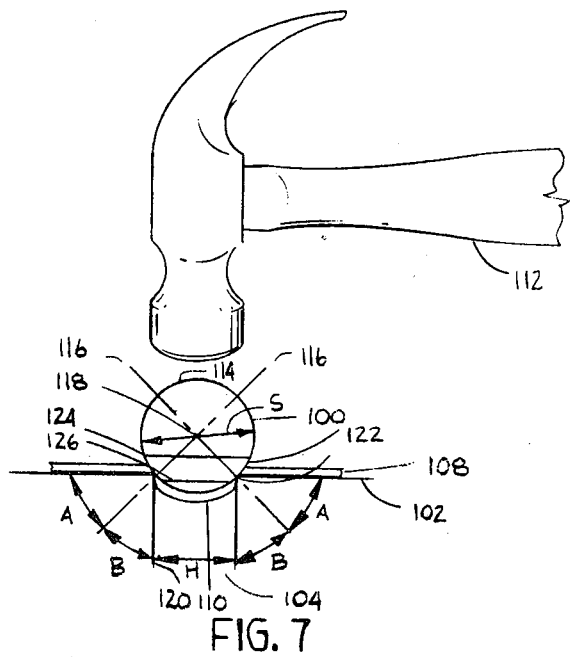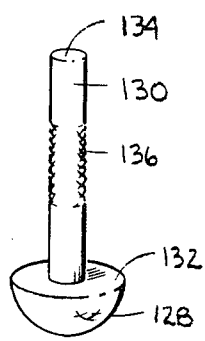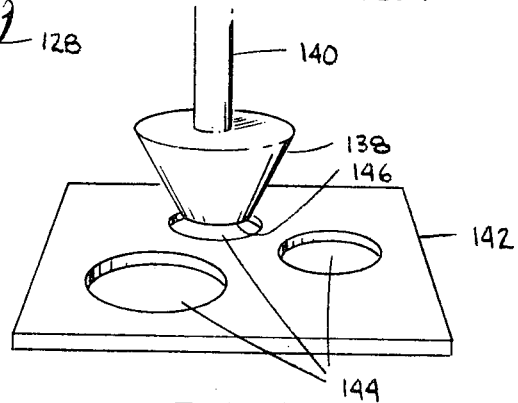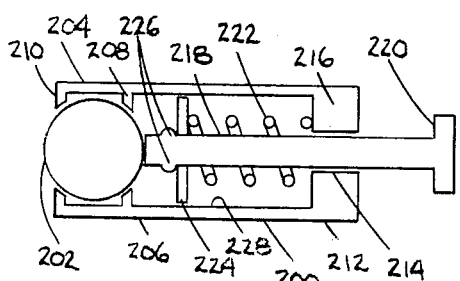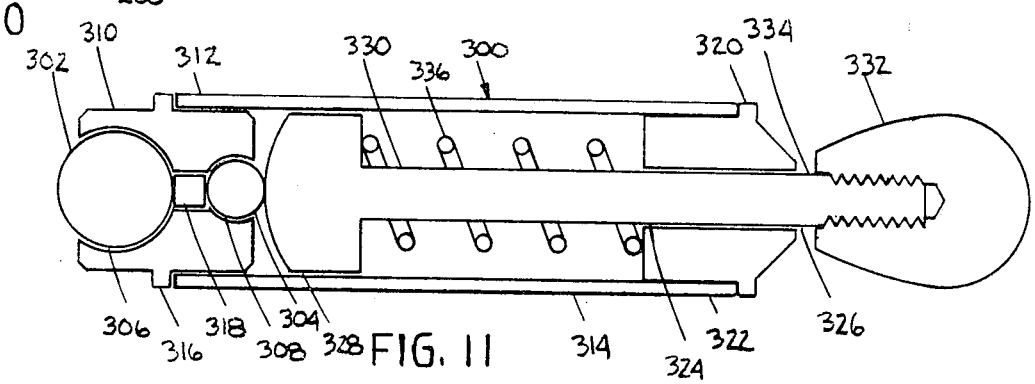

METHOD AND APPARATUS FOR REPAIRING DAMAGED MATERIALS PARTICULARLY SUITED TO REPAIRING KNIT OR POLYESTER MATERIALS

BACKGROUND OF THE INVENTION

The invention involves a method and apparatus for repairing materials such as clothing fabrics. The invention is particularly advantageous when used to repair woven polyester fabrics or knit fabrics.

When a portion of material becomes damaged, such as by a cigarette burn, in the past it has been difficult to make a repair that will not show. This is particularly a problem with knit and woven polyester fabrics such as the now commonly used polyester double knit fabrics.

One method of repairing such materials is to reweave the damaged area. This is a relatively expensive and specialized process not readily available to all. It requires a high level of skill especially to prevent the repair from being visible. A second method of repair involves cutting a circular hole in the material around the damaged area, inserting a circular patch of the same or similar material and then placing a circular iron on patch, larger in diameter than the patch, over the patch on the reverse side of the material to secure the patch in place.

This method results in a thicker than normal area of the material which may show when the material is pressed and also results in an area that does not have the same flexibility and elasticity as the surrounding material. Upon washing and pressing of the patched area the adhesive often loses its strength. If the patching material is different from the basic material or its properties are altered due to the heat sensitive adhesive then differential shrinkage may occur around the patch upon washing. The adhesive used is often weakened by the effect on it of chemicals used in cleaning and washing. The edges of the patch and the basic material around often fray because there is no adhesive at this point.

The method disclosed provides a simple inexpensive method of performing material repairs. The flexibility and elasticity of the basic material at the patch situs are maintained. The patching is permanent in that it is resistive to chemicals used normally in cleaning and washing materials and to the effects of temperatures normally encountered in pressing. The edges of the material at the edge of the patch are prevented from shredding. Since the material thickness remains the same and the basic material properties are maintained the resultant patch is difficult to see.

Earlier devices for cutting fabrics include, of course, scissors and knives. These devices require that the user be very careful and precise if duplicate cuts are to be made as required, for optimum results from the disclosed method. Scissors are particularly difficult to use to cut out small holes in a central portion of the material.

A device for cutting circular holes in materials has been previously developed. It operates on the same basic principle as a cookie cutter. A circular blade is rotated while pressed against the surface to be cut causing a round plug to be cut from the material. This type of cutter must be held normal to the surface to be cut to get a uniform cut such that the entire perimeter of the area to be removed is completely severed. In using such a device the twisting action of the cutting tool tends to twist the material being cut and to result in an imperfect circle. This occurs most often when the cutting edge becomes dull as through normal use. Vitale U.S. Pat. No. 3,459,293 discloses such a device.

The apparatus disclosed is a simply operated, uncomplicated device for accurately cutting circular holes in material. The device allows accurate duplication of the holes such that a patch may be cut to snugly fit within a hole cut by the same device. It does not require accurate positioning normal to the material to achieve a uniform cut. The cutting action does not twist the material being cut thus avoiding the otherwise problematical distortion of the material.

SUMMARY OF THE INVENTION

The invention relates to the repair of materials such as those fabrics used in clothing. The invention involves a method of making such repairs and further comprises an apparatus particularly suited to practicing such method. The invention is especially suited to repairing knit materials such as polyester double knits.

Often clothing materials become damaged such as through being burned by cigarette ashes. Utilizing the method described the damaged area may be patched in a manner which will result in a repair that will be difficult to detect.

To make a repair in the preferred manner, a piece of identical material to the damaged portion is first obtained for a patch. This material may be taken from an inconspicous place on the garment such as from the extra material found in a cuff, hem, or on an internal seam. Where the damaged material is patterned, the patch material should include that portion of the pattern that surrounds and includes the damaged area. The patch material should be of sufficient size to cover the damaged area.

The patch material is then positioned over the damaged area and the patterns of the two pieces arranged to coincide.

A circular cut is made through both pieces of material simultaneously. The circular plug from the damaged material containing the damaged area is discarded as is the excess material surrounding the circular patch.

The circular patch is inserted into the hole created in the basic material and then rotated to align the patterns.

Masking tape is then placed on the front side of the fabric covering the patch causing it to be secured in place.

The material is then turned over to expose the reverse side and a silicone adhesive is applied to the junction of the patch and the basic material so as to penetrate through the material to a point near the front surface.

Upon the curing of the adhesive the masking tape may be removed.

The resulting repair is a low visibility patch which is simply executed and maintains the basic flexibility and elastic properties of the original material. The garment may be cleaned and pressed as usual without the patch losing its integrity. The edges of the patch are secured by the adhesive and will resist fraying.

The inventor has developed an apparatus that is particularly suited for use with this process. The apparatus is used to cut the round holes around the damaged area and an accurately sized patch which will fit into the hole whether cut simultaneously or separately.

The basic apparatus comprises a cutting die, hereafter referred to simply as a die, which has a top surface and a circular hole in the top surface. The perimeter of the hole defining a sharp edge. A punch having a spherical face such as a ball is sized such that the punch will not pass through the hole in the die. To utilize the apparatus the material to be cut is interposed between the punch and the die with the perimeter of the hole defining the area to be cut. By bringing the punch and die together sharply, such as by striking the sphere opposite its area of contact with the material with a hammer, the sharp edge of the hole will cause the material to be severed. A single hole may be punched or by interposing multiple layers of material several holes may be made at once. Due to the simplicity of the method of use and the nature of the components the holes made will be identical. Further, due to the form of the punch face and die the alignment of the punch relative to the anvil and the accuracy of the hammer blow are not critical to making repeatable, clean cuts.

The punch may take other forms such as a hemisphere on the end of a shaft.

The punch face may be a spherical section or any other surface, such as cone or spheroid section, having a circular perimeter in its transverse cross section where it contacts the perimeter of the hole in the die.

In its preferred form a striking mechanism is incorporated into the punch and the punch has two interchangeable ends. It comprises a cylindrical body having its back end enclosed except for a central passageway. A shaft extends axially along the interior of the body with a transversely mounted disk attached to its first end near the front end of the body. The shaft extends slideably through the passageway in the back end of the body and a grip is provided on the second end of the shaft. A compression spring is axially disposed between the disk and the enclosed end of the body such that pulling the grip away from the back of the body compresses the spring. A cylindrical punch holder fits receivably in the front end of the body. A central circumferential shoulder on the holder limits the travel of the holder to approximately midway into the body. Two metal spheres are held rigidly each in one end of the holder such that a portion of each sphere protrudes from the ends of the holder. The holder may be inserted in the body with either end exposed.

DESCRIPTION OF THE DRAWINGS

FIG. 6 is a section in perspective through the repair situs illustrating application of adhesive to the repair joint, preferably on the inside of the cloth.

FIG. 7 is a side elevation of a spherical punch in use, with the die shown in section.

FIG. 8 is a side elevation in perspective of a hemispherical punch having a shank.

FIG. 9 is a side elevation in perspective of a conical punch having a shank with a cooperating multi-hole die.

FIG. 10 is a side elevation in section of an embodiment of the punch with an integral striking mechanism.

FIG. 11 is a side elevation in section of the preferred embodiment of the punch with an integral striking mechanism.

DETAILED DESCRIPTION OF THE INVENTION

The Invention in General

The invention involves a method and apparatus for repairing materials by patching, such as clothing fabrics.

The invention is particularly suited to the repair of knit and woven materials. The now commonly used double knit polyester fabrics are most advantageously repaired by use of the disclosed method and apparatus.

The disclosure is directed toward the repair of materials such as fabrics used in garments but the invention may be applied advantageously to similar materials, both natural and man-made.

Often clothing materials will become damaged, such as by being burned by cigarette ashes. Utilizing the disclosed invention it is possible to repair the material in a simple, inexpensive and permanent manner. The repair utilizing the invention is invisible, or nearly so.

Preferred Method

Figure 1A:
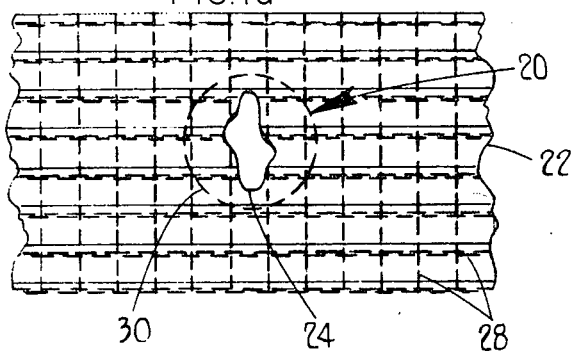
FIG. 1(a) and 1(b) is a plan view of a patterned piece of damaged material to be patched and a piece of patterned patching material.
Figure 1B:
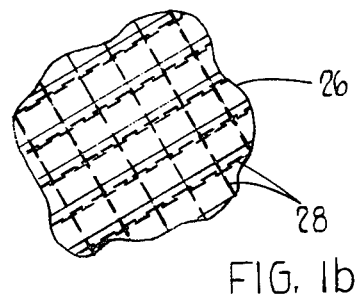

Referring to FIG. 1(a), the size of a circular area 20 of the material 22, including the damaged area 24, is first determined and a piece of duplicate material 26, shown in FIG. 1(b), larger than this area 20 to be replaced is obtained. The duplicate material may be from the same or similar material obtained from an independent source or it may be from an area of the garment, such as a cuff, hem, or interior seam where it would not be noticeable to remove, such a piece. The patch material 26 should include that portion of the material pattern 28 that is contained in the area to be removed 20.

Figure 2:
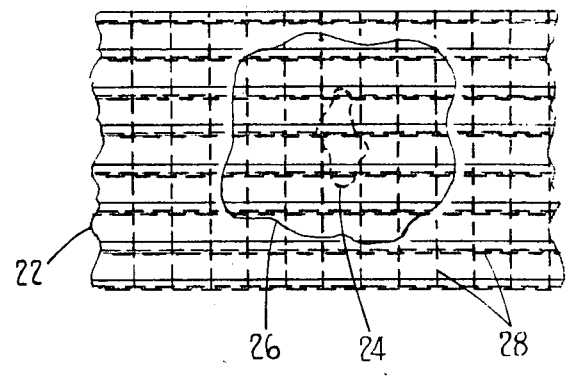
FIG. 2 is a plan view of the piece of patching material placed over the damaged area with the patterns aligned.

Referring to FIG. 2, the patch material 26 is then placed on the material to be repaired 22 over the damaged area. The two pieces of material are then moved relative to one another to cause the patterns on the two pieces to coincide.

Figure 3:
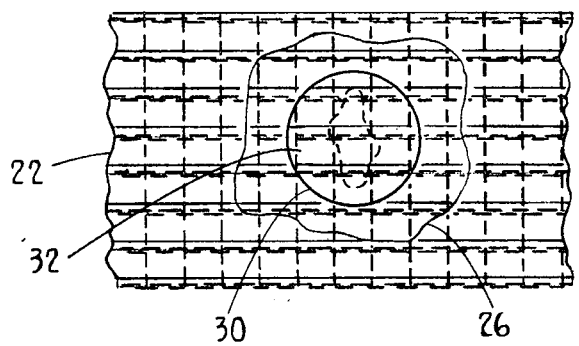
FIG. 3 is a plan view of the piece of patching material placed over the damaged area illustrating the location of a cut through both pieces.

Referring to FIG. 3, while the two pieces of fabric are aligned, they are simultaneously cut along the line 30 defining the order of the area to be removed. The cut thus will result in severing a circular patch 32 identical in size, shape and pattern to that area 20 to be replaced which is also severed at the same time. The cut may be made by using a knife, scissors, a cookie cutter type cutter or preferably the apparatus subsequently described in this disclosure. The best results from the use of this process is obtained when the cut is accurately made circular and identical for both pieces of material 22 and 26.

Figure 4:
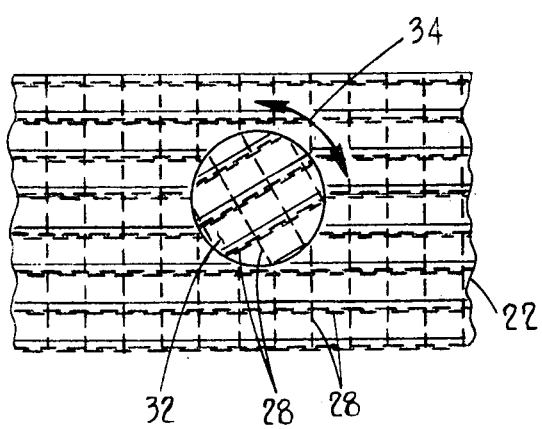
FIG. 4 is a plan view of the circular patch positioned in the circular hole cut in the material to be repaired.

Referring to FIG. 4, the patch 32 is inserted into the opening left by the damaged portion removed. The patch is rotated, as indicated by the arrows 34 so that the pattern 28 on the patch 32 and the material 22 are aligned such that the pattern remains uniform over the material and patch.

Figure 5:
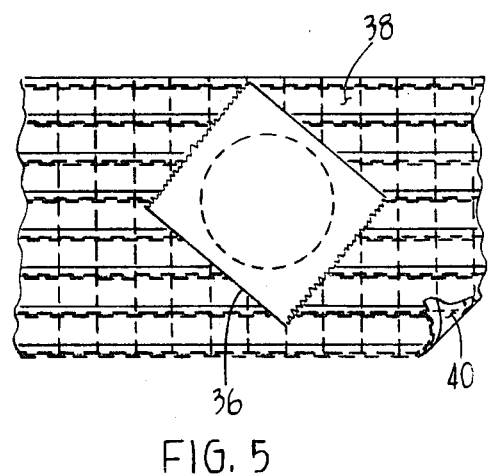
FIG. 5 is a plan view of the adhesive tape placed over the area being repaired with the patch in place.

Referring to FIG. 5, a length of masking tape 36 is applied across the face 38 of the material, stretching over the patch 32 to secure it in place to prepare for application of adhesive to the reverse side 40 of the material.

Referring to FIG. 6, the material 22 is turned over to expose the reverse side of the fabric, that side normally not visible when the garment is not worn. Clear silicone adhesive 42 from a typical tube applicator 44 is applied to the joint 46 between the patch 32 and the material 22 and in sufficient quantity to penetrate to a depth near the front surface. A piece of scrap material may be used for testing the amount of adhesive that is necessary. The adhesive 46 upon curing secures the patch 32 to the material 22 whereupon the masking tape may be removed to complete the repair.

Other Methods

The same basic alignment procedure as above described is utilized where the fabric has a grain or texture that is directionally oriented, whether or not the fabric also has a pattern.

The cutting of the patch 32 and removal of the damaged area 24 may be done in separate cutting steps. The single step operation is preferred because of the beneficial results obtained when the patch is sized and shaped identically with the area 20 removed from the material 22. If the patch is too large, puckering may result and if it is too small voids will appear at the joint 46 between the patch 32 and the material 22.

Noncircular patches may be used, but the circular patch is preferred so that alignment of the pattern and/or grain of the material may be made easily by rotating the patch.

The step of taping may be omitted, especially where the work can be laid on a flat surface while the adhesive is applied. It is preferable to use the tape because this aids in getting the front surface 38 of both the patch 32 and the material 22 flush particularly at the joint 46.

Other types of adhesive tape may be utilized, but masking tape is preferred because it has a limited amount of adhesive on its surface enabling easy removal.

A latex adhesive has been found to be a suitable substitute for the silicone adhesive. The silicone adhesive is preferred because of its heat and chemical resistant properties as well as its strength and flexibility. These properties permit ironing, washing, and cleaning with those temperatures, detergents, and chemicals normally used in such processes without diminishing the integrity of the repair. The flexibility of the silicone adhesive assures that the natural flexing of the material in use is not greatly altered in the area of the patch, which inflexibility would cause the repair to appear prominently. There are other adhesives commercially available which may be utilized, some specifically developed to be used for repairing fabrics.

The penetration of the glue from the rear surface 40, to near the front surface 38 of the material is preferred, but not required. The preference for such penetration is that it prevents the joint 46 from pulling apart creating a noticeable gap at the front surface 38 when the material is flexed. Penetration to a point near the front surface is preferred over full penetration because of the effect of the adhesive on the fabric appearance. Although silicone adhesive comes in a clear form, it may cause the material that it contacts to appear wet. This is particularly apparent in light colored fabrics. Where this is not a problem, or appearance is not important, full penetration of the adhesive may be allowed, resulting in a stronger bond. Full penetration is simpler to achieve than partial penetration. Adhesive penetration at the joint prevents fraying at the repair situs.

Advantages Obtained by Using the Method

There are a number of advantages to utilizing the above described method. The process is a simple, effective one that may be performed by an unskilled person. The basic fabric properties of pattern, grain and flexibility are maintained. The resulting patch is resistant to heat and chemicals to which the material would typically be subjected to during washing, cleaning, and pressing. Also, the edges of the material and patch are prevented from fraying. The method does not increase the thickness of the material. These factors all contribute to result in an invisible or near invisible patch.

Basic Embodiments of the Apparatus

This portion of the disclosure relates to an apparatus in several embodiments which is useful in cutting holes in materials such as garment fabrics.

A form of the apparatus simply cuts circular holes of a uniform diameter. Because of the uniformity of the holes cut, the simplicity of the operation, and the circular shape of the holes cut, the apparatus is particularly well suited to performing the cutting step or steps in the above related method.

Referring to FIG. 7, the apparatus in a basic form involves a sphere 100. The sphere must be of a hard material. Steel balls such as ball bearings are ideal. The ball serves as a punch. A cutting die, hereinafter referred to simply as a die, comprises a flat surface 102 which has a hole 104 passing through the surface 102 normal to the surface. A sharp corner 106 is thus formed on the upper perimeter of the hole 104. Inserting the ball in the hole, when the ball is larger in diameter than the hole, will result in uniform contact of the sharp edge 106 with the surface of the sphere 100.

To use the apparatus a piece of material 108 is placed over the hole 104. The edge of the hole 106 encircling that portion to be removed 110. The sphere 100 is placed in the hole 104, but on top of the material 108. The user takes a hammer 112 and sharply strikes the sphere 100 on its top 114 opposite the hole 104. The impact forces the sphere 100 against the sharp edge 106 severing the material 108 in between and separating a circular area to be removed 110 from the material 108.

The optimum sphere diameter S to hole diameter diameter H ratio is $\sqrt{2}:1$. At this ratio, ignoring the effect of the material thickness, the radial lines 16 passing through the center of the sphere 118 and through the edge of the hole 106 contacting the surface of the sphere forms angles A and B with the surface 102 and the hole walls 120 respectively which are both 45°. With this relationship, the cutting edge 106 is as tangential as possible to the surface of the ball at the point of contact with the sphere's surface.

The primary required characteristic of a punch surface is a longitudinally tapered surface with a transverse cross section in the shape of the hole in the die to contact the edge of the hole 106.

The punch surface may consist of a portion of the surface of a sphere. A surface of a spherical segment, such as that portion 122 of the sphere 100 between two circumferential lines 124 and 126 above and below respectively the edge of the hole 106 when the punch is in the hole 104, may be used as the punch surface.

Referring to FIG. 8, the punch may be in the form of a hemisphere 128 including a shank 130 attached normal to the flat surface 132 of the hemisphere. The top end 134 of the shank 130 provides a striking face where a hammer blow may be applied. A circumferential knurled area 136 may be used on the shank 130 to aid in gripping the punch.

Referring to FIG. 9, the punch may assume the form of a cone without a tip 138 including a shank 140. The cooperating die may assume the form of a plate 142 containing a series of different sized holes 144. The size of the desired cut to be made in the material depending on the particular hole chosen for use. A single punch may be used for a range of hole sizes.

The tip of the punch 146 may be flattened to reduce the penetration of the punch into the hole. The less penetration into the hole, the closer the size of the area cut out will be to the size of the hole 144 in the plate 142. Normally because the penetration forces the material down into the hole, as shown in FIG. 7, the hole cut will be slightly larger than that in the plate. It is preferable to have only a small amount of penetration. This is because when a portion of material is being removed that has a hole in it already, such as a cigarette burn, the effect of the penetration is reduced by penetration through the burn hole and the hole cut will be smaller than the replacement patch cut with the same punch. This effect is beneficial to some extent, though, in that it assures that the patch will fit snugly.

It is possible to have punches that are non-circular in their transverse cross section with correspondingly shaped dies; for instance, square, oval, or oblong. The circular cross-section punch and die would, generally, be less expensive to make and has the other advantages of tolerating misalignment in use while maintaining uniform contact and making a path that can be rotated in position to align the patch. The non-circular devices could be advantageously used where the damaged area more closely conforms to that shape and use of a circular device would result in removal of more material than is really necessary.

The cutting action of the material 108 being forced against the edge 106 of the hole may occur through forcing the punch against the die while the die is held stationary, as above described, or vice versa.

Referring to FIG. 10, the means for striking the punch may be incorporated with the punch into a single assembly 200. The punch, such as a sphere 202, is retained in the front end 204 of a hollow cylindrical body 206 by an inner interior circumferential ridge 208 and an outer interior circumferential ridge 210. The inner ridge 208 assures that the sphere 202 extends from the front end 204 of the body 206. The outer ridge 210 prevents the sphere from falling out of the body but is not necessary to the function of the device. The ridges are spaced from each other such that the sphere is permitted some longitudinal movement within the body. The second end 212 of the body is enclosed and has a central passageway 214 extending axially through the enclosing end 216. A shaft 218 extends through the passageway 214 into the interior of the body 206 to near the sphere 202. A grip 220 is attached to the outer end of the shaft. A compression spring 222 is positioned longitudinally inside the body 206 between the enclosing end 216 and a disc 224 attached to the shaft 218 inside the body 206. The attachment of the disc 224 may be accomplished by passing the shaft through it and providing protrusions 226 on the shaft 218 adjacent the disc 224 on the side closest the sphere. When the grip 220 is pulled to withdraw the shaft from the second end of the body 212, the spring is compressed and upon releasing the grip 220 the shaft 218 impacts with the sphere 202 driving it outward. To use the assembly 200 to cut a hole the sphere 202 is contacted with the material and die in the same manner as shown in FIG. 7. The inner ridge 208 prevents the front end of the body 204 from resting against the material that is, it assures that the punch is opposed to a diameter equal to or larger than the hole in the die with which it is to be used. While the body is held in one hand, the grip may be pulled and released to drive the sphere against the anvil cutting the material.

The central passageway 214 serves as a guide for the shaft 218.

The disc 224 may be sized such that it slidably contacts the interior surfaces 228 of the body to act as a guide for the shaft.

The heavier in mass the shaft is, the more solid the impact is with the punch and for this reason a heavier shaft is preferred.

The method of spring loading or otherwise creating such action in the shaft is not critical. Any method for doing such would generally be satisfactory.

Preferred Embodiment of a More Universal Apparatus

The preferred embodiment 300 of the punch and hammer assembly is shown in FIG. 11 which would cooperate with the preferred form of the die which is shown in FIG. 9, being a plate 142 containing a series of different sized holes. The preferred embodiment has two different diameter spheres 302 and 304 pressed into and protruding partially from receiving holes 306 and 308 respectively in either end of a cylindrical holder 310 which fits slidably into the front end 312 of a hollow cylindrical body 314. A circumferential shoulder 316 runs about the central portion of the holder 310 to prevent the holder from sliding entirely within the body 314. High impact polystryene plastic has worked well as the holder material. The spheres 302 and 304 are preferably made from steel. A pin 318 preferably also of steel is placed axially within the holder and abuts each sphere 302 and 304 to transmit the impacting forces from one sphere to another. An end cap 320 fits rigidly in the rear end 322 of the holder. The end cap 320 has a central passageway 324 axially located in the center of the cap 320 through which passes a shaft 326 having a cylindrical disc 328 attached to its first end 330 adjacent to the holder and a grip 332 its second end 334 outside the holder 314. The shaft 326 and the disc are preferably made of steel to provide mass. The disc 328 fits slidably within the body 314. A compression spring 336 is longitudinally disposed around the shaft 326. Withdrawing the shaft from the body compresses the spring. Releasing the shaft causes the disc to impact with the interior sphere 304 and through the pin 318 driving the exterior sphere 302 outward. For use with a different range of hole sizes in the die the holder 310 is turned end for end to expose the sphere 304. Since the holder is pressed against the die in use there is no need to secure it into the body. The preferred embodiment is used generally the same as the above described device illustrated in FIG. 10.

Further Embodiments of More Universal Apparatus

The punch and holder may be made as a single solid component.

It is not essential that only the spherical surfaced punches be used with any device similar to those shown in FIGS. 10 and 11. The other surface shapes referred to above may be utilized.

Advantages Obtained by Using the Apparatus

Using the apparatus above described results in an accurately circular hole which may be accurately duplicated. These characteristics make it ideally suited for use with the above described method. The shape of the punch and die, particularly those having a surface including portions of a spherical surface, permits a wide latitude of misalignment of the punch from the normal to the die surface without affecting the quality or accuracy of the cut. The incorporation of the striking mechanism into the apparatus makes the device easily operable by someone who is not very adept at using a hammer. This results in a simple device that is very simple to operate.

I claim:

1. An apparatus, for manual operation, for cutting materials particularly suited for cutting clothing fabric comprising:
   a. a cutting die having a flat surface and a hole passing through the surface normal to the surface whereby a sharp edge is defined along the perimeter of the hole at the intersection with the flat surface;
   b. a punch having a longitudinally tapered surface end, creating in transverse cross section the shape of the hole, which will contact the perimeter of the hole to permit the cutting of a hole in the material, when the material is interposed between the punch and the die, and they are brought together;
   c. a body having a central cavity containing the punch with the contact surface of the punch extending from the first end of this central cavity;
   d. means for retaining the contact surface of the punch at the first end of the cavity such that the surface of the contact surface of the punch extends from the cavity to permit full contact with the corresponding hole in the die;
   e. a shaft longitudinally positioned in the central cavity with the first shaft end adjacent the punch and the second shaft end extending from the rear of the cavity; and
   c. means for biasing the shaft relative to the body so that the punch may be forcefully driven against the die by first withdrawing the shaft from the rear of the central cavity against the force of the biasing means and then releasing the shaft such that the shaft is driven by the force of the biasing means and impacts against the punch opposite the contact surface of the die and the punch is then moved against the die.

2. An apparatus for cutting materials, as claimed in claim 1, wherein the hole in the die is circular and the biasing means comprises:
   a. a compression spring within said cavity;
   b. a means for limiting the movement of the spring toward the first end of the shaft; and
   c. a means for limiting the movement of the spring toward the rear end of the cavity.

3. An apparatus for cutting materials, as claimed in claim 2 wherein the punch contact surface portion comprises the surface of a spherical segment.

4. An apparatus for cutting materials, as claimed in claim 3, wherein the punch comprises a sphere and the retaining means comprises a shoulder extending inward from the central cavity walls of the body.

5. An apparatus for cutting materials, as claimed in claim 2, wherein the punch comprises a cylindrical portion, slidably fitting within the body, having hemispherical end protrusions on either end of the cylindrical portion, the spherical diameter being different for the two protrusions; whereby the punch may be turned end for end and used to cut different size holes, when utilized with a die having respective holes of a corresponding size.

6. An apparatus for manually cutting materials, particularly suited to cutting holes in clothing fabrics, comprising
   a. a cutting die having a flat surface and a hole passing through the surface normal to the surface so that a sharp edge is defined along the perimeter of the hole at its intersection with the flat surface; and
   b. a punch having a longitudinally tapered surface end, creating in a transverse cross section the shape of the hole, which will contact the perimeter of the hole to permit the cutting of a hole in the material, when the material is interposed between the longitudinally tapered surface and the die and they are brought together and having a shank connected to the longitudinally tapered surface at one end and having a striking face at its other end permitting the punch to be hand held while in use and conveniently struck to effect the cutting.

7. An apparatus for cutting materials, as claimed in claim 6, wherein the hole in the die is circular, wherein the striking face comprises a flat surface normal to the longitudinal axis of the shank, and wherein the transverse cross section contact portion of the punch comprises a spherical segment.

8. An apparatus for cutting materials, as claimed in claim 7, wherein the spherical segment comprises a hemisphere and the radius of the hemispherical section is related to the diameter of the hole by the ratio of $1:\infty 2$.

9. An apparatus for cutting materials, as claimed in claim 8, wherein the punch further comprises an elongated cylindrical shank between the first and second end and a knurled circumferential section about the shank for gripping the punch.

* * * * *